United States Patent [19]
Yoshinaga et al.

[11] Patent Number: 4,943,868
[45] Date of Patent: Jul. 24, 1990

[54] HANDY IMAGE DATA FILING APPARATUS

[75] Inventors: Yoshio Yoshinaga, Mitaka; Wataru Shimizu, Kodaira; Toshio Obara, Yokohama, all of Japan

[73] Assignee: Kabushiki Kaisha Toshiba, Kawasaki, Japan

[21] Appl. No.: 314,170

[22] Filed: Feb. 23, 1989

[30] Foreign Application Priority Data

Mar. 1, 1988 [JP] Japan .................................. 63-48290
Mar. 1, 1988 [JP] Japan .................................. 63-48291

[51] Int. Cl.$^5$ .............................................. H04N 1/00
[52] U.S. Cl. ..................................... 358/403; 358/444; 358/473
[58] Field of Search ............... 358/403, 444, 471, 473; 235/492, 385, 380; 382/59

[56] References Cited

U.S. PATENT DOCUMENTS

| 4,438,459 | 3/1984 | Levine | 358/406 |
| 4,604,653 | 8/1986 | Shimizu | 358/403 |
| 4,766,294 | 8/1988 | Nara et al. | 235/380 |

Primary Examiner—Edward L. Coles, Sr.
Attorney, Agent, or Firm—Cushman, Darby & Cushman

[57] ABSTRACT

A handy image data filing apparatus is disclosed, which is made up of a hand scanner as an image data reading device and an IC memory card as an image data storing medium. Image data on an object such as a name card is read by the hand scanner, and filed into the IC memory card. The read data is stored into the IC memory card, together with ID data for identifying the image data to be stored. The ID data is used for retrieving the image data later, and is entered from a keyboard. For retrieval, ID data corresponding to the desired image data is entered from the keyboard. The image data is specified by the ID data entered, and displayed by a liquid crystal display device.

19 Claims, 14 Drawing Sheets

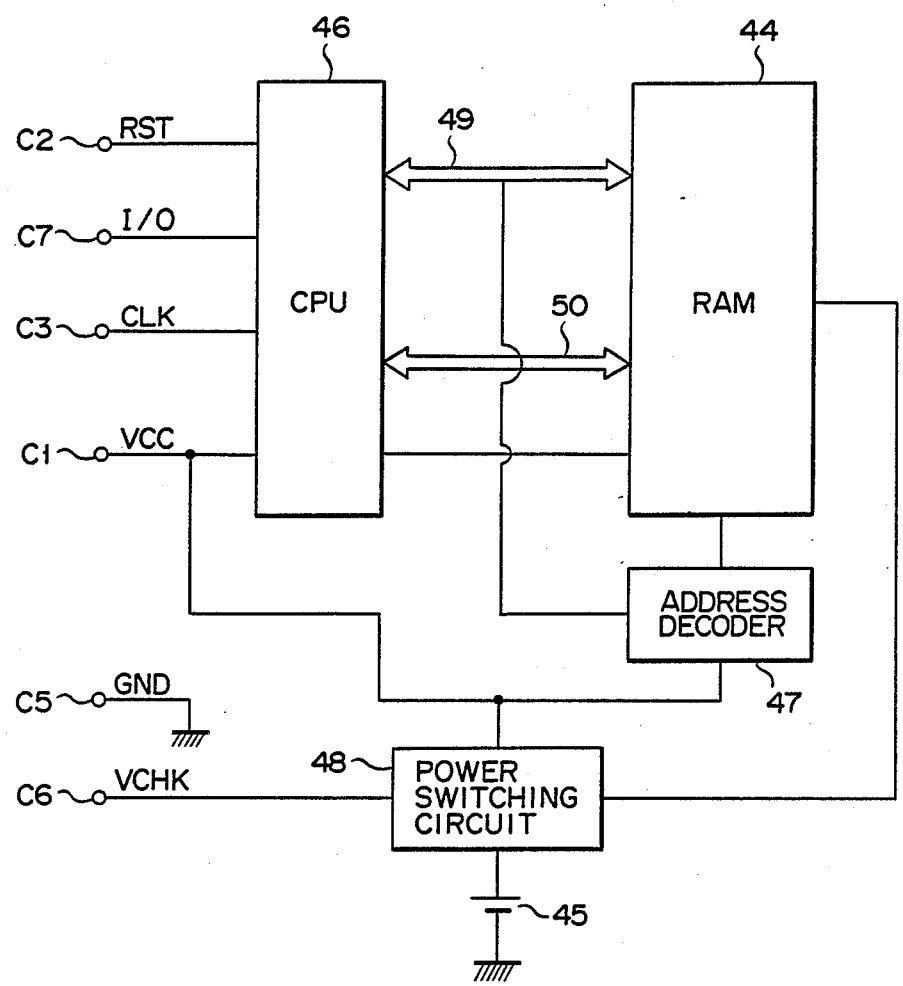
F I G. 4

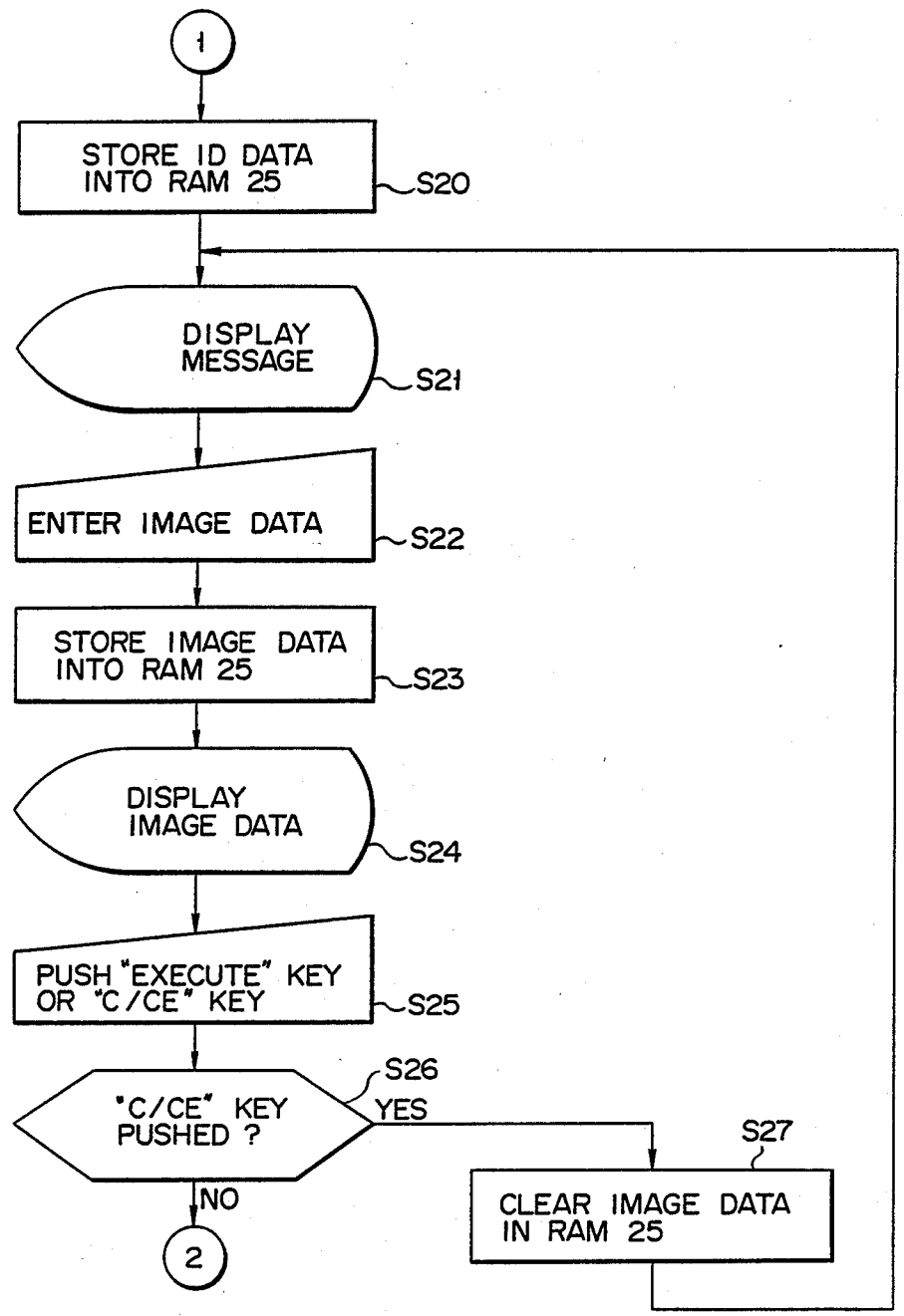
F I G. 6B

HANDY IMAGE DATA FILING APPARATUS

Background of the Invention

1. Field of the Invention

The present invention relates to a handy image data filing apparatus of the type in which image data on name cards, for example, are stored into an IC memory card, and if required later, are read-out of the memory card and visually displayed.

2. Description of the Related Art

Recently, an apparatus for filing a large amount of image data such as documents, called an image data filing apparatus (electronic filing apparatus) using an optical disc, has been developed and put into practice. Such an image data filing apparatus is disclosed in U.S. Pat. No. 4,604,653.

In this type of image data filing apparatus, storage of the image data is performed in the following way. A document bearing image data to be stored is first set in a scanner. ID data (retrieval data) is entered into the apparatus, from a keyboard. The scanner scans the image data on the document, and reads the data. The image data is then supplied to an image data processing unit. The image data processing unit adds the ID data to the supplied image data, and condenses or encodes the image data with the ID data. The encoded image data with the ID data is stored on an optical disk.

To retrieve the image data thus stored, the ID data of the image data to be retrieved is first entered from the keyboard. According to the entered ID data, the image data processing unit retrieves the image data attached to the corresponding ID data from the optical disk. The retrieved image data is expanded (or decoded) and restored into the original image data. The restored image data is displayed by a display device or printed out into a hard copy by a printer.

As described above, the conventional image data filing apparatus uses an optical disk as an image data storing medium. As well known, the optical disc is advantageous in high access speed, low cost, and large memory capacity, but is disadvantageous in that it requires a large drive device. Therefore, it is very difficult to reduce the size and weight of the whole image data filing apparatus, and hence to provide a light weight, compact image memory filing apparatus.

In the case that an image area of a document to be input is larger than the display area of a display device, the image data is dividedly read from the image area as several data groups, which are entered by several times by the scanner, and each data group of the image data is displayed on the display area. Such data entering work is time consuming and troublesome, and more adversely, when the divided image data are combined for reproduction, the composite image data tends to suffer from overlapping or dropping necessary parts of the image data.

Summary of the Invention

Accordingly, an object of the present invention is to provide an image data filing apparatus which is handy and compact in handling and size, and light in weight.

To achieve the above objects, there is provided a handy image data filing apparatus comprising image data reading means for reading the image data on an object, entry means for entering retrieval data which identifying the image data, IC memory means, removably set to the apparatus, for storing the image data storage control means for storing into the IC memory means the image data read by the image data reading means together with the retrieval data entered by the entry means, read control means for reading out the image data from the IC memory means according to the retrieval data entered from the entry means, display means for displaying the image data read-out by the read control means, and portable housing means for containing the entry means, the storage control means, the read control means, and the display means.

Brief Description of the Drawings

FIG. 4 is a block diagram showing a circuit configuration of the IC memory card of FIG. 3;

FIGS. 6A through 6C, in combination, show a flowchart useful in explaining a sequence of operations for filing image data;

Detailed Description of the Preferred Embodiments

Figure 1:
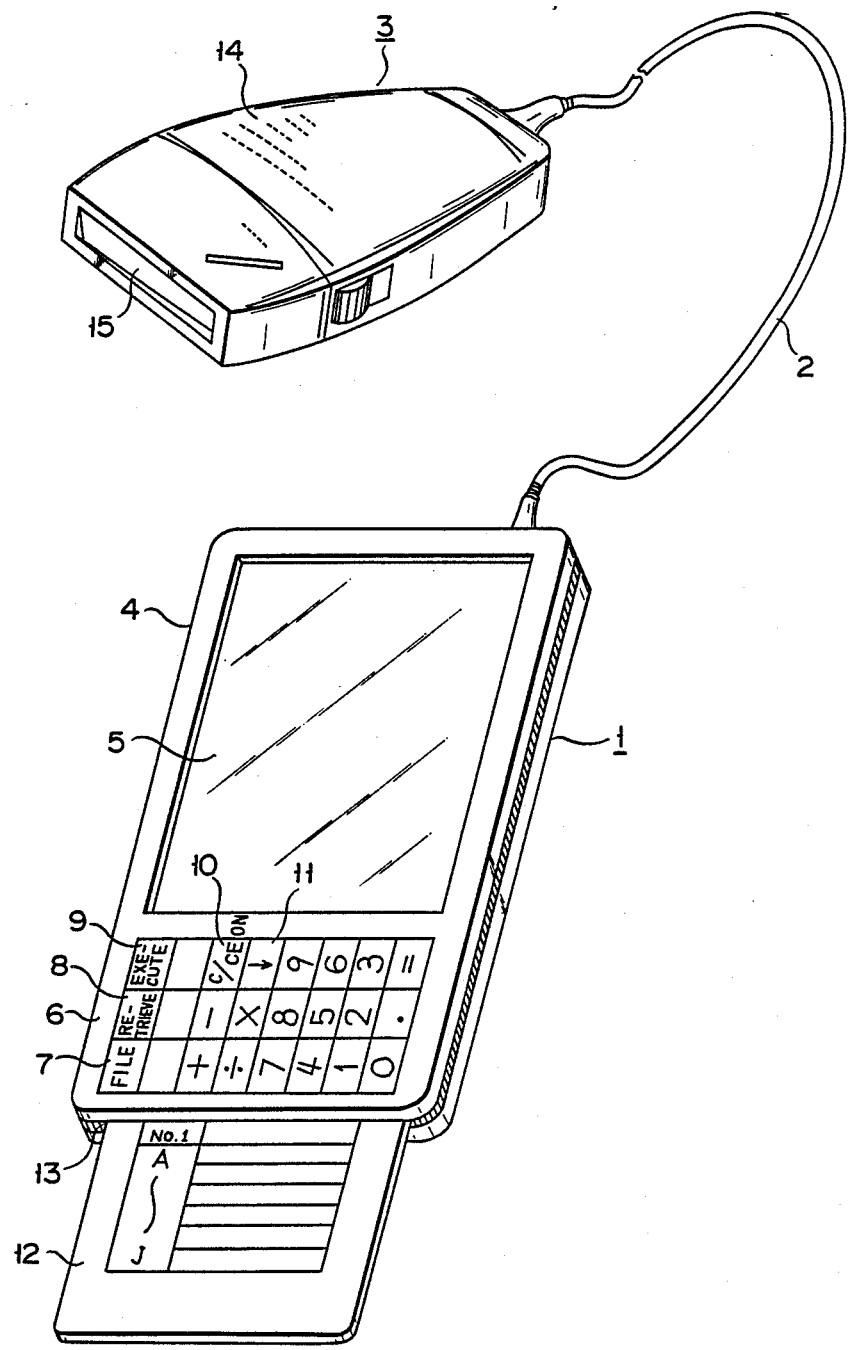
FIG. 1 shows an external view of a handy image data filing apparatus according to a first embodiment of the present invention.

FIG. 1 shows an appearance of a handy image data filing apparatus according to a first embodiment of the present invention. The handy image data filing apparatus comprises main body 1 and hand scanner 3, as an image reading section, which is connected to main body 1 by means of cable 2.

Main body 1 uses portable housing 4, which is a thin rectangular prism. Liquid crystal display (LCD) window 5, as an image display section, and keyboard 6, as a key entry section, are provided on one of the major surfaces of housing 4. Keyboard 6 contains ten keys functioning as alphanumeric and kana (Japanese phonetic symbols) keys, function keys, and the like. Further, keyboard 6 contains filing ("FILE") key 7, retrieval ("RETRIEVE") key 8, execution ("EXECUTE") key 9, clear/power ("C/CE") key 10, display shift (" ↓ ") key 11, and the like.

The bottom end face (as viewed in the drawing) of housing 4 is opened to form a slot 13 through which IC memory card 12 as a data recording medium is removably inserted into the housing. A reader/writer (not shown) is installed at a suitable location of slot 13 of housing 4.

Hand scanner 3 uses a thick frame 14 of a hand-held type. Frame 14 is provided at the top end face with a rectangular window 15 through which image data is read. The width of window 15 is generally longer than the shorter side of a name card, but it is preferably that the width of window 15 has the same length of the shorter side of the name card. Frame 14 contains many components although those are not illustrated. Those components are a light source for emitting rays of light toward an object whose image data is to be read, through window 15, and image sensor of the CCD type for receiving the rays of light reflected at the object through window 15, and converting them into electrical signals, an optical system for appropriately guiding the rays of light including image data, a drive circuit for driving the light source and the image sensor, a signal processing circuit for properly processing the converted electrical signals from the image sensor, and the like.

To read image data on an object, an operator holds hand scanner 3, and moves it on and along the object in a desired direction, with window 15 in contact with the object surface.

Figure 2:
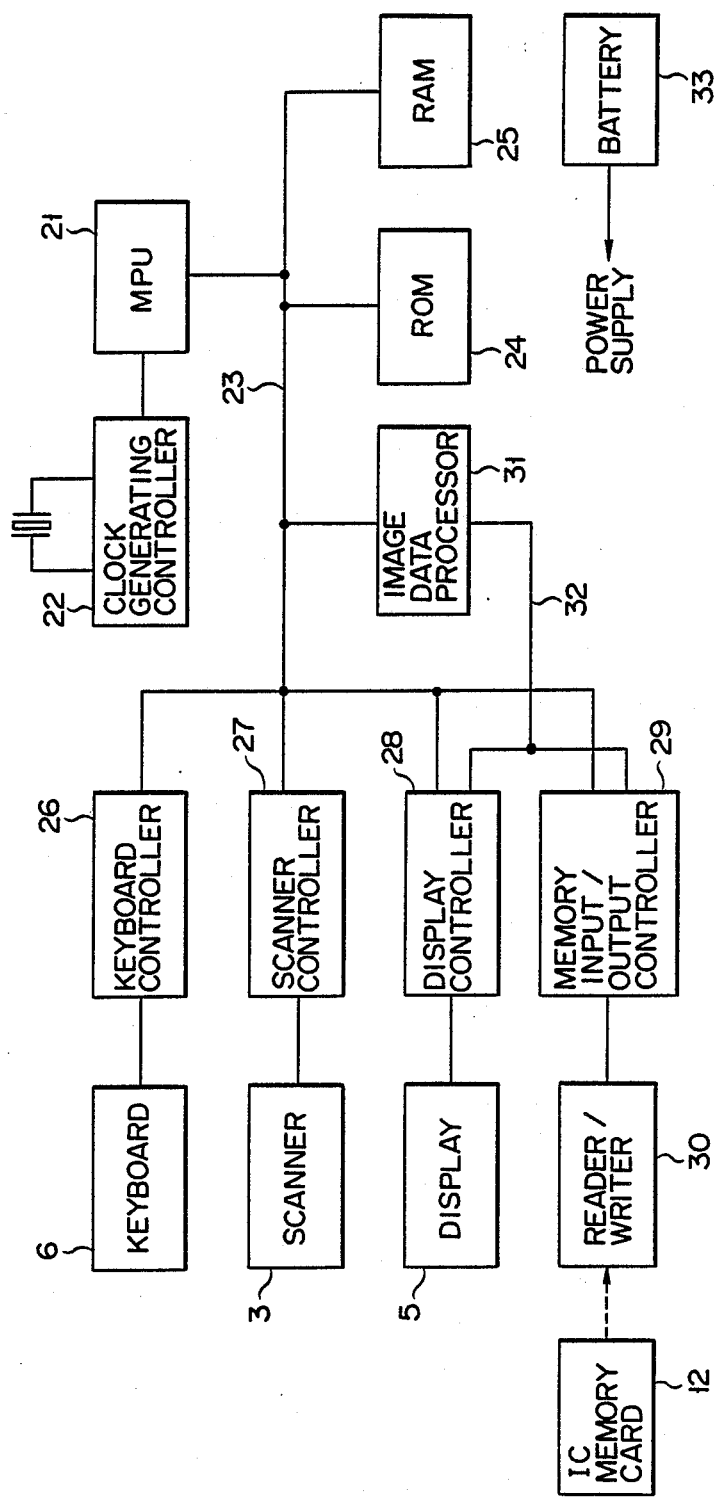
FIG. 2 is a block diagram showing a circuit configuration of the handy image data filing apparatus of FIG. 1.

Turning now to FIG. 2, there is shown a circuit configuration of the handy image data filing apparatus shown in FIG. 1. Microprocessor unit (MPU) 21 for controlling an overall system of the apparatus operates in synchronism with a clock signal supplied from clock generating controller 22. MPU 21 is coupled with system bus 23. System bus 23 is further coupled with read only memory (ROM) 24 and random access memory (RAM) 25. ROM 24 stores, for example, a basic control program for MPU 21. RAM 25 temporarily stores application programs and data.

Additionally, system bus 23 is coupled with keyboard controller 26 for controlling keyboard 6, scanner controller 27 for controlling hand scanner 3, display controller 28 for controlling liquid crystal display 5, and memory input/output controller 29. Memory input/output controller 29 is connected to reader/writer 30 for transferring data to and from IC memory card 12. System bus 23 is also coupled with image data processor 31 for condensing and expanding image data. The image data condensed or expanded by data image processor 31 is output to image bus 32. Image bus 32 is connected to display controller 28, and memory input/output controller 29. The above respective units are supplied with electrical power from battery 33.

Figure 3:
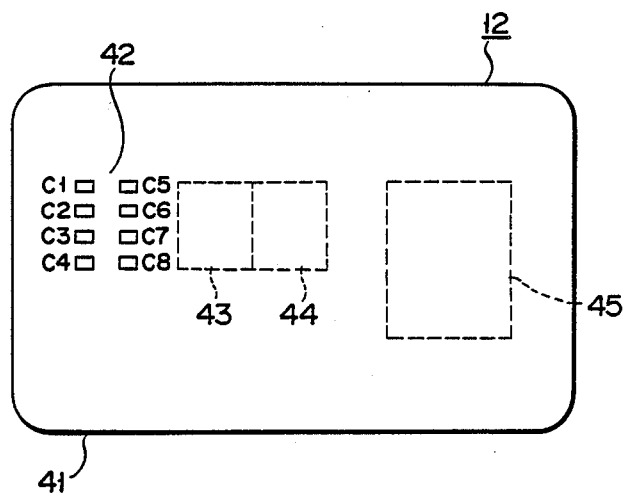
FIG. 3 shows an external view of an IC memory card used by the handy image data filing apparatus of FIG. 1.

An external view of IC memory card 12 is illustrated in FIG. 3. Card main body 41 is made of a rectangular, thin plastic plate, for example. Contact section 42 is provided near the upper left corner (as viewed in the drawing) of card main body 41. Contact section 42 is electrically connected to an integrated circuit (IC) buried in card main body 41, and is designed to be in electrical contact with reader/writer 30. Contact section 42 includes power terminal C1 for supplying external electric power, reset terminal C2 for supplying a reset signal as a start-up signal, clock terminal C3 for supplying a clock signal, ground terminal C5, voltage check terminal C6 for checking battery voltage, input/output terminal C7 for inputting/ outputting data, and the like.

Card main body 41 contains MPU 43, RAM 44 as an image memory, both being IC fabricated, and an additional battery 45 for backing up RAM 44.

FIG. 4 shows a circuit configuration of IC memory card 12. MPU 43 is made up of CPU 46, address decoder 47, and power switching circuit 48. MPU 43 is connected to terminals C1 to C3, and C5 to C7. CPU 46 is connected to RAM 44 by means of address bus 49 and data bus 50. It is further connected through address bus 49 to address decoder 47. Address decoder 47 is connected to RAM 44. With such an arrangement, CPU 46 controls the read/write operation of data for RAM 44, and checks if other retrieval data (ID data) coincident with the retrieval data entered anew exists.

Power switching circuit 48 selectively supplies electric power from battery 45 and that from power terminal C1 to RAM 44. Normally, it supplies the electric power from battery 45 to RAM 44. When IC memory card 12 is set to read/writer 30, it supplies the power at terminal C1 to RAM 44.

Figure 5:
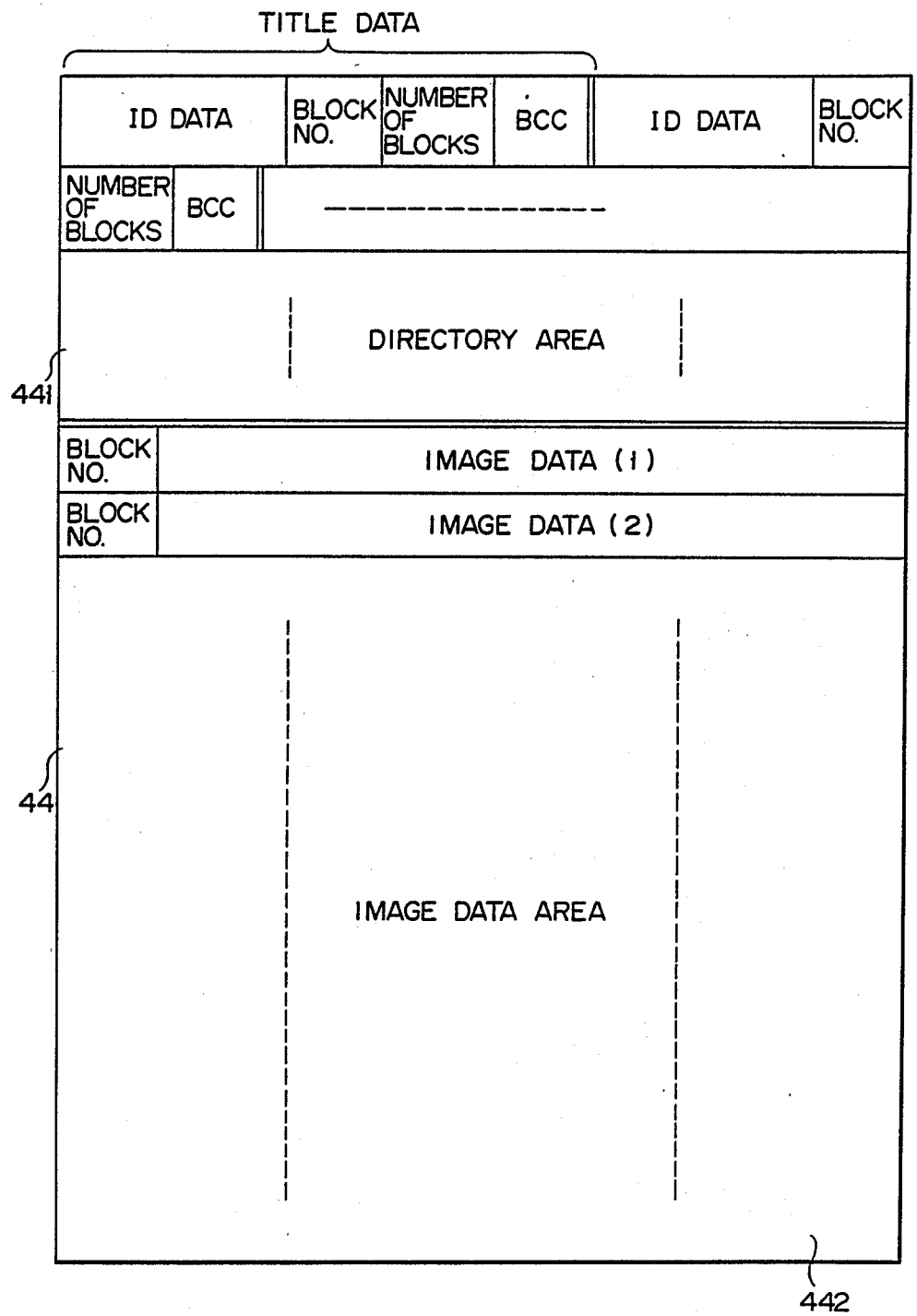
FIG. 5 shows a memory map of a RAM of the IC memory card.

FIG. 5 shows a memory map of RAM 44 contained in IC memory card 12. As shown, a memory area of RAM 44 is divided into directory area 441 and image data area 442. Title data of the image data already stored is written into directory area 441. The title data includes ID data corresponding to the image data, block number of the start block, number of blocks, and block check code (BCC).

Image data is written into image data area 442. In writing image data, one item of image data is blocked with a word length of 4 kilo bytes, for example. In other words, when written, image data is divided into a plurality of blocks. Block numbers are serially attached to the start of those blocks.

The block number, which is written as the title data in directory area 441, is a block number attached to the start block of those blocks constituting one item of image data. The number of blocks indicates the number of blocks making up one item of image data. The BCC indicates the result of a predetermined calculation applied to ID data, block number, and number of blocks.

The operation of the handy image data filing apparatus thus arranged will be described.

Figure 6A:
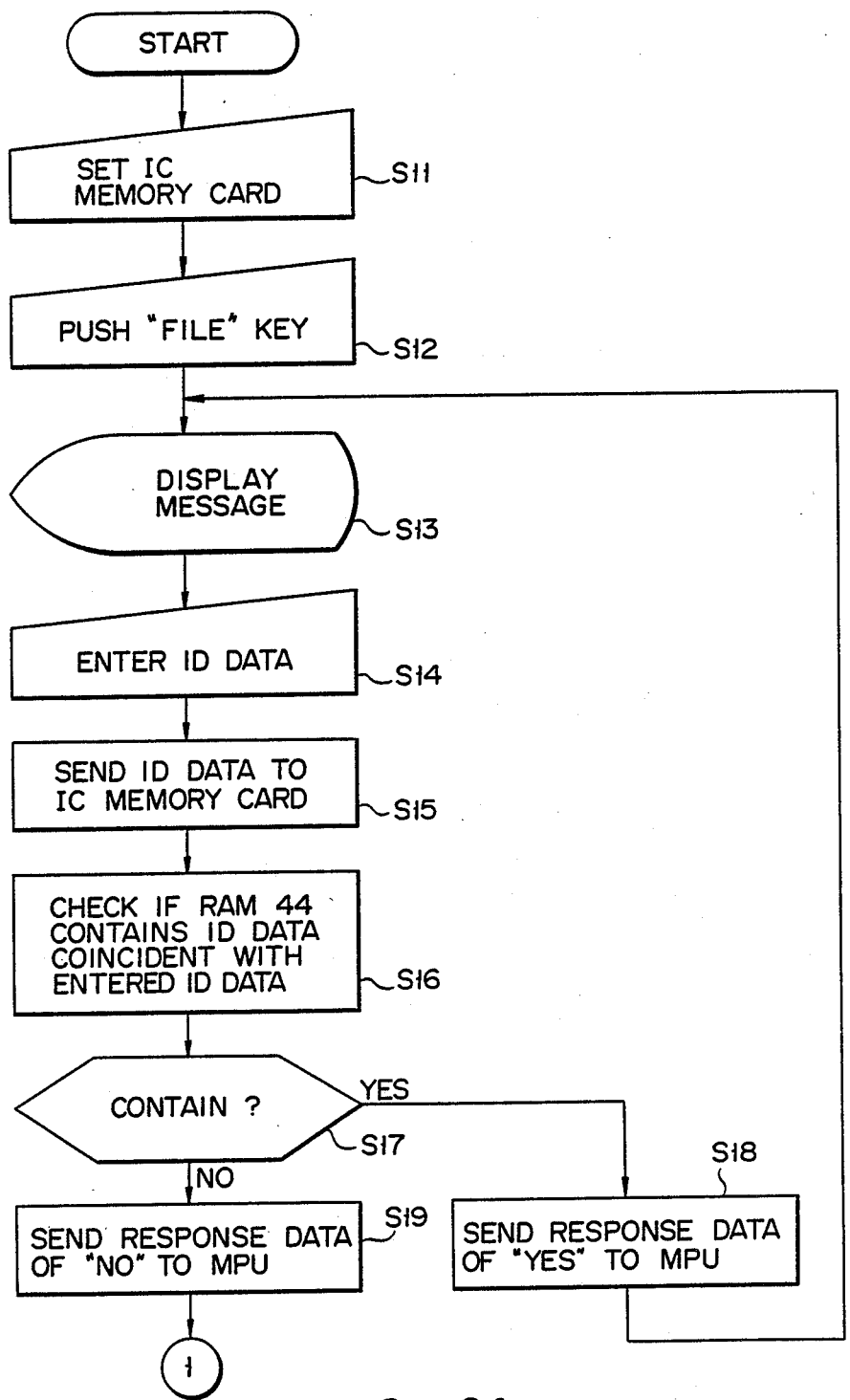
Figure 6C:
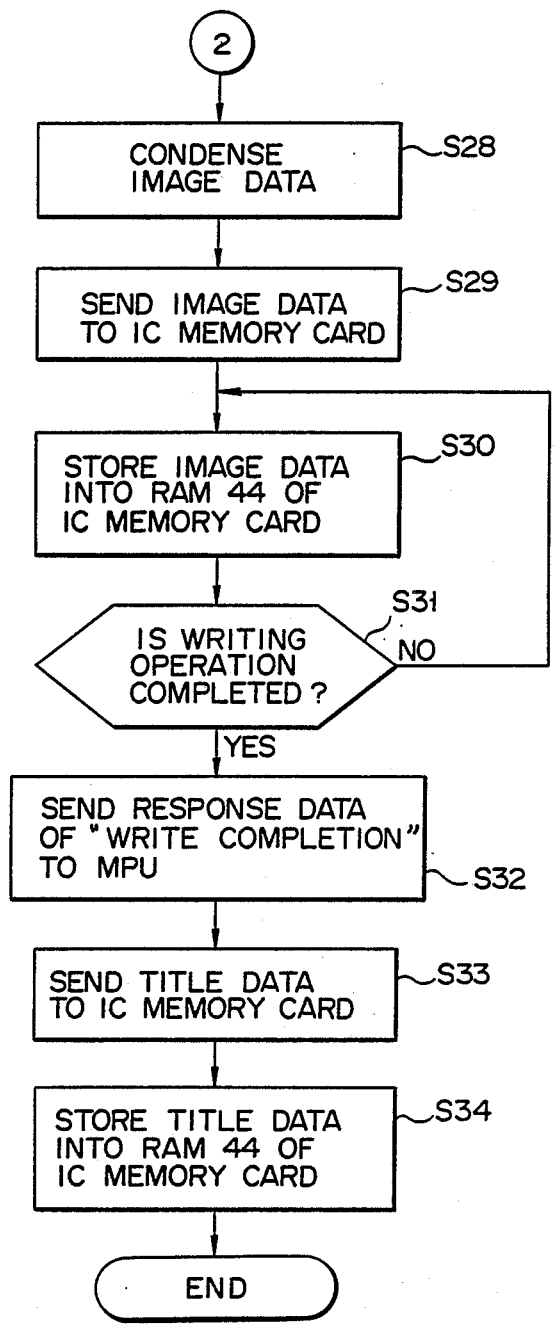

A first description to be given with reference to FIGS. 6A through 6C relates to the filing of image data into the apparatus. An operator first inserts IC memory card 12 into slot 13 (step S11). Then, he pushes filing ("FILE") key 7 on keyboard 6 (step S12). In response to this, MPU 21 starts up an operation based on a registered program in ROM 24, and LCD 5 displays a message for ID data entry (step S13). After seeing the message, the operator operates keyboard 6 to enter desired ID data, e.g., a person's name (step S14). In response to the ID data entry, MPU 21 sends the entered ID data to CPU 46 of IC memory card 12 by way of memory input/output controller 29 and reader/writer 30 (step S15).

CPU 46 of card 12 checks if there is other ID data coincident with the newly entered ID data (step S16). It sequentially compares the ID data entered anew with each of the ID data corresponding to the image data already stored in RAM 44. If ID data coincident with the new ID data is found (step S17), the CPU sends response data representative of the ID data coincidence to MPU 21 (step S18), and MPU 21 then drives LCD 5 to display a message stating that the same ID data is present, and requests the operator to enter another ID data (step S13).

If the same ID data is not found (step S17), the CPU sends response data representative of it to MPU 21 (step S19). MPU 21 temporarily stores the entered ID data in RAM 25 (step S20, FIG. 6B), and displays a message of the image data entry by LCD 5 (step S21). According to the message, the operator scans an object with image data to be stored, for example, a name card, by hand scanner 3, to read the image data on the name card (step S22). The image data is digitized in scanner controller 27, and stored into RAM 25 under control of MPU 21 (step S23). Subsequently, MPU 21 supplies the image data of RAM 25 through system bus 23 to display controller 28, and LCD 5 displays it (step S24).

The operator sees the display on LCD 5, and checks if the name card has been correctly entered, and on the basis of the check result, he operates execution ("EXECUTE") key 9 or clear ("C/CE") key 10 on keyboard 6 (step S25). If "C/CE" key 10 is pushed (step S26), MPU 21 clears the image data in RAM 25 (step S27), and displays a message to re-enter image data by display 5 (step S21).

When "EXECUTE" key 9 is pushed (step S26), MPU 21 supplies the image data in RAM 25 to image data processor 31 via system bus 23. Image data processor 31 condenses (codes) the supplied image data (step S28, FIG. 6C), and formats or blocks the image data into a format of IC memory card 12, i.e., data blocks each of 4 kilo bytes word length, and supplies them through image bus 32 to memory input/output controller 29. Before supplying each block (word), MPU 21 supplies consecutive block numbers each of four digits to memory input/output controller 29. From memory input/output controller 29, the image data made up of a plurality of blocks, of which start blocks have block numbers, is sent through reader/writer 30 to CPU 46 of IC memory card 12 (step S29). When receiving the blocked image data, CPU 46 sequentially writes them into image data area 442 of RAM 44 (step S30).

When the writing of the image data has correctly been completed (step S31), CPU 46 sends to MPU 21 response data representing that the data writing has been completed, through reader/writer 30 and memory input/output controller 29 (step S32). Upon receipt of this, MPU 21 sends the title data of the written image data through memory input/output controller 29 and reader/writer 30 to CPU 46 of IC memory card 12 (step S33). As recalled, the title data contains the ID data memorized on RAM 25, the block number of the start block, number of blocks, and block check code for them. CPU 46 writes the title data into an empty area of directory area 441 (step S34). In this way, the filing processing for one item of image data is performed.

Figure 7A:
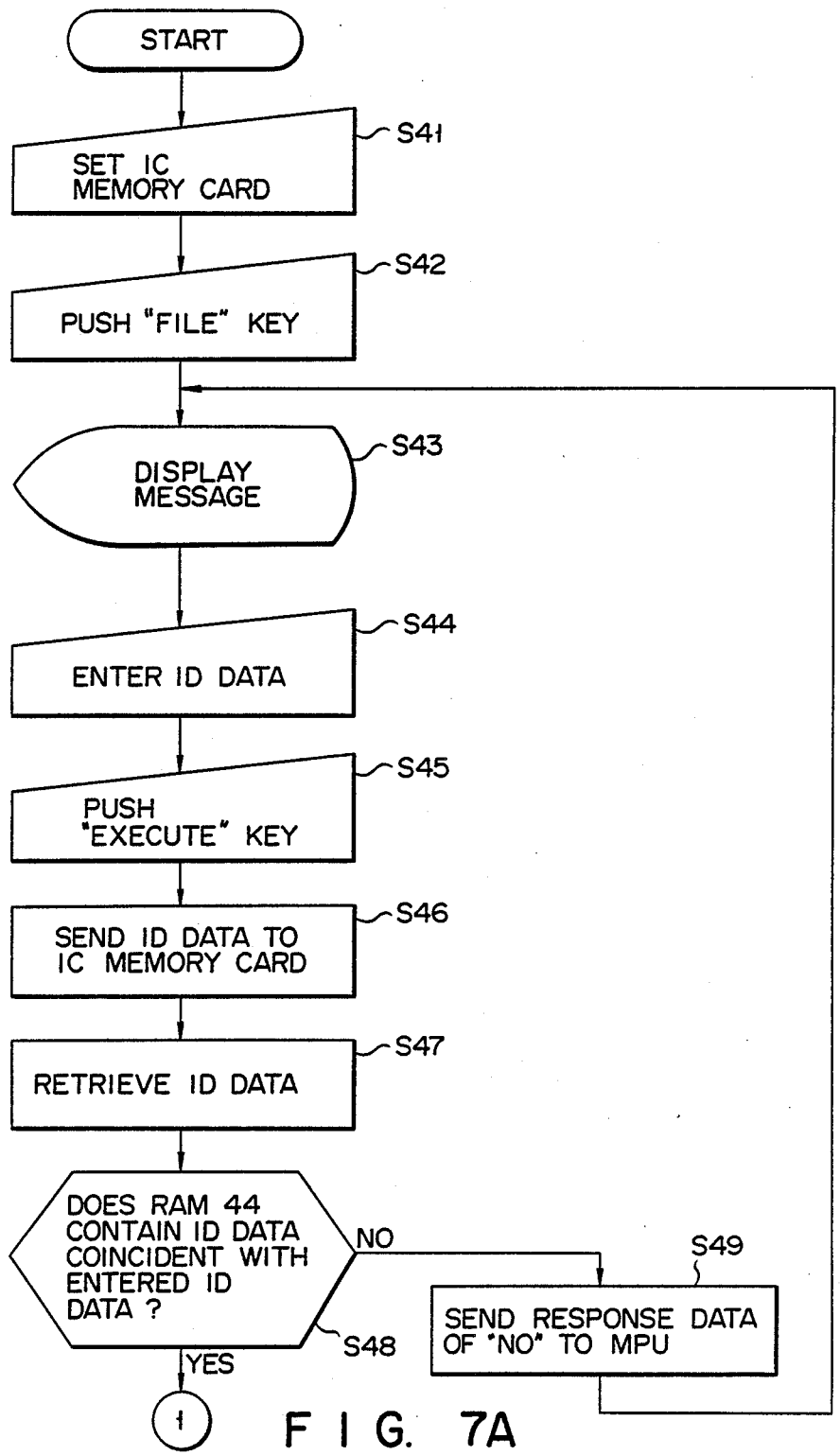
FIGS. 7A and 7B cooperate to show a flowchart useful in explaining a sequence of operations for retrieving image data.
Figure 7B:
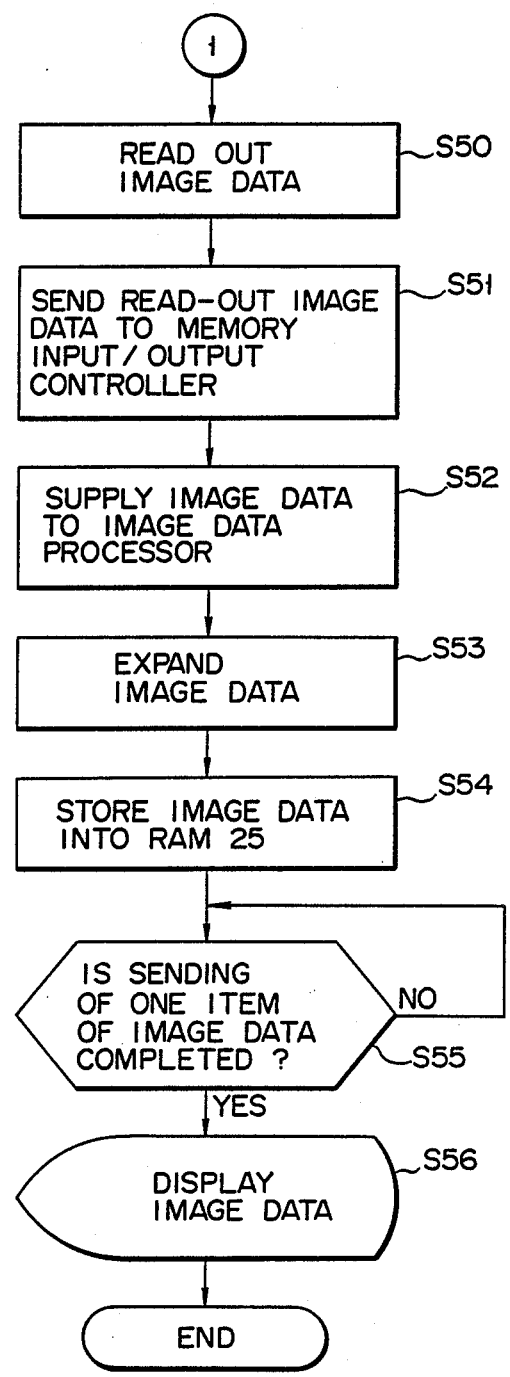

The operation of the handy image data filing apparatus when image data is retrieved will be described with reference to the flowchart shown in FIGS. 7A and 7B.

An operator first inserts IC memory card 12 into slot 13 to set the card at reader/writer 30 (step S41). Then, he pushes retrieval ("RETRIEVE") key 8 on keyboard 6 (step S42). In response to this, MPU 21 starts an operation based on a retrieval program in ROM 24, and displays a message to request entry of ID data by LCD 5 (step S43). According to the message, the operator enters ID data, e.g., a person's name, of image data to be retrieved by keyboard 6 (step S44). Then, he pushes execution ("EXECUTE") key 9 (step S45). MPU 21 senses this and sends the ID data to CPU 46 of IC memory card 12, via memory input/output controller 29 and reader/writer 30 (step S46).

CPU 46 of the card searches ID data as stored in directory area 441 in RAM 44, which is coincident with the entered ID data (step S47). When the intended ID data is not found (step S48), the CPU sends response data indicating that no intended ID data is present, to MPU 21 through reader/writer 30 and memory input/output controller 29 (step S49). MPU 21 displays a message of ID data error by LCD 5, and requests the operator to reenter ID data (step S43).

If the ID data coincident with the entered ID data is found in directory area 441 of RAM 44 (step S48), CPU 46 sequentially reads out, on the basis of the block number and the number of blocks in the title dta which contains the ID data coincident with the entered ID data, the image data of that number of blocks belonging to the image data of that block number, from the image data area 442 of RAM 44 (step S50). The image data is sequentially sent to memory input/output controller 29 through reader/writer 30 (step S51).

Memory input/output controller 29 sequentially supplies the image data through image bus 32 to image data processor 31 (step S52). Since the image data received is the condensed (encoded) data, image data processor 31 expands (decodes) and restores it into the original image data (step S53). Subsequently, the restored image data is supplied through system bus 23 to RAM 25, and stored therein (step S54). Upon completion of sending one item of image data from IC memory card 12 (step S55), MPU 21 supplies the restored image data in RAM 25 to display controller 28 via system bus 23, and LCD 5 displays it (step S56). At this point, the retrieval operation of one item of image data is complete.

As described above, in the handy image data filing apparatus according to the first embodiment of the present invention, desired image data is read by a hand scanner, and stored into an IC memory card, together with ID data to identify the image data. The ID data is entered from a keyboard. To retrieve desired image data, an operator enters ID data corresponding to that image data from the keyboard. The retrieved image data is displayed by an LCD.

Since the handy image data filing apparatus uses the IC memory card as a data storing medium, the size and weight of the apparatus are remarkably reduced when compared with those of the conventional image data filing apparatus using an optical disk. Therefore, if a battery is used for a power supply, any operator can use it any time and in any place for image data storage and retrieval. The IC memory card storing the image data may be set to another card reader. This ensures a variety of applications.

In the handy image data filing apparatus of the first embodiment, a display area (i.e., screen) of the display is substantially equal to the size of a name card, ensuring a displayed image of a size comparable with the real size. If the display area is further reduced, the overall size and weight of the apparatus may be reduced. In this case, some modification is required for retrieval processing to avoid overlapping or dropping of the image data. This will be discussed below.

Figure 8A:
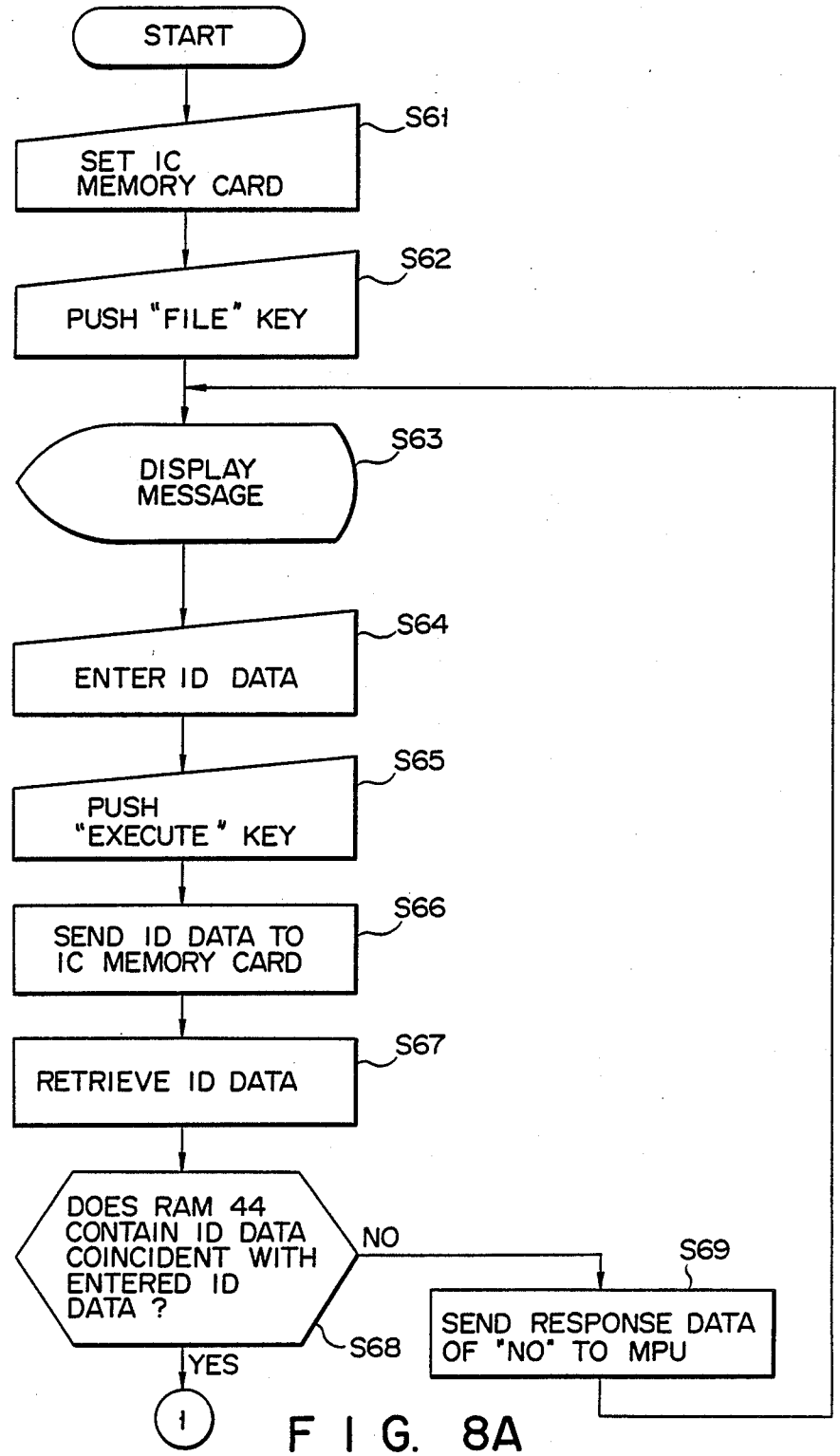
FIGS. 8A through 8C, in combination, show a flowchart useful in explaining a sequence of operations for retrieving image data by using a handy image data filing apparatus according to a second embodiment of the present invention.
Figure 8B:
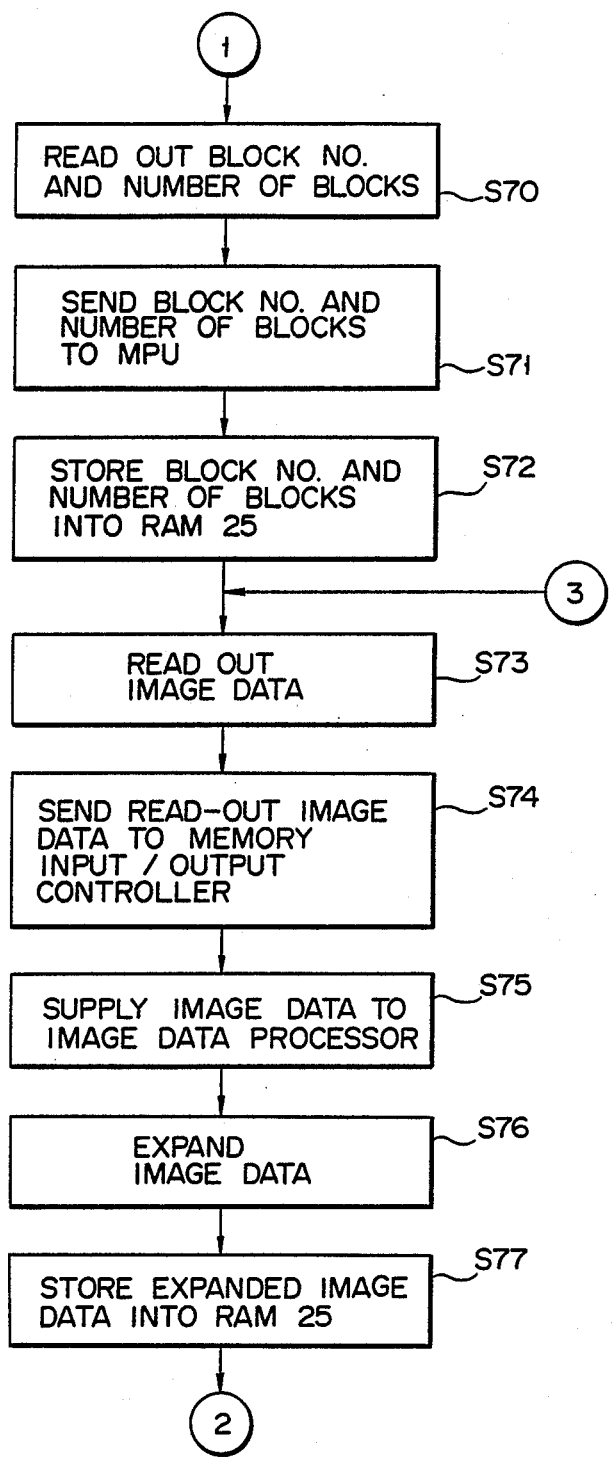
Figure 8C:
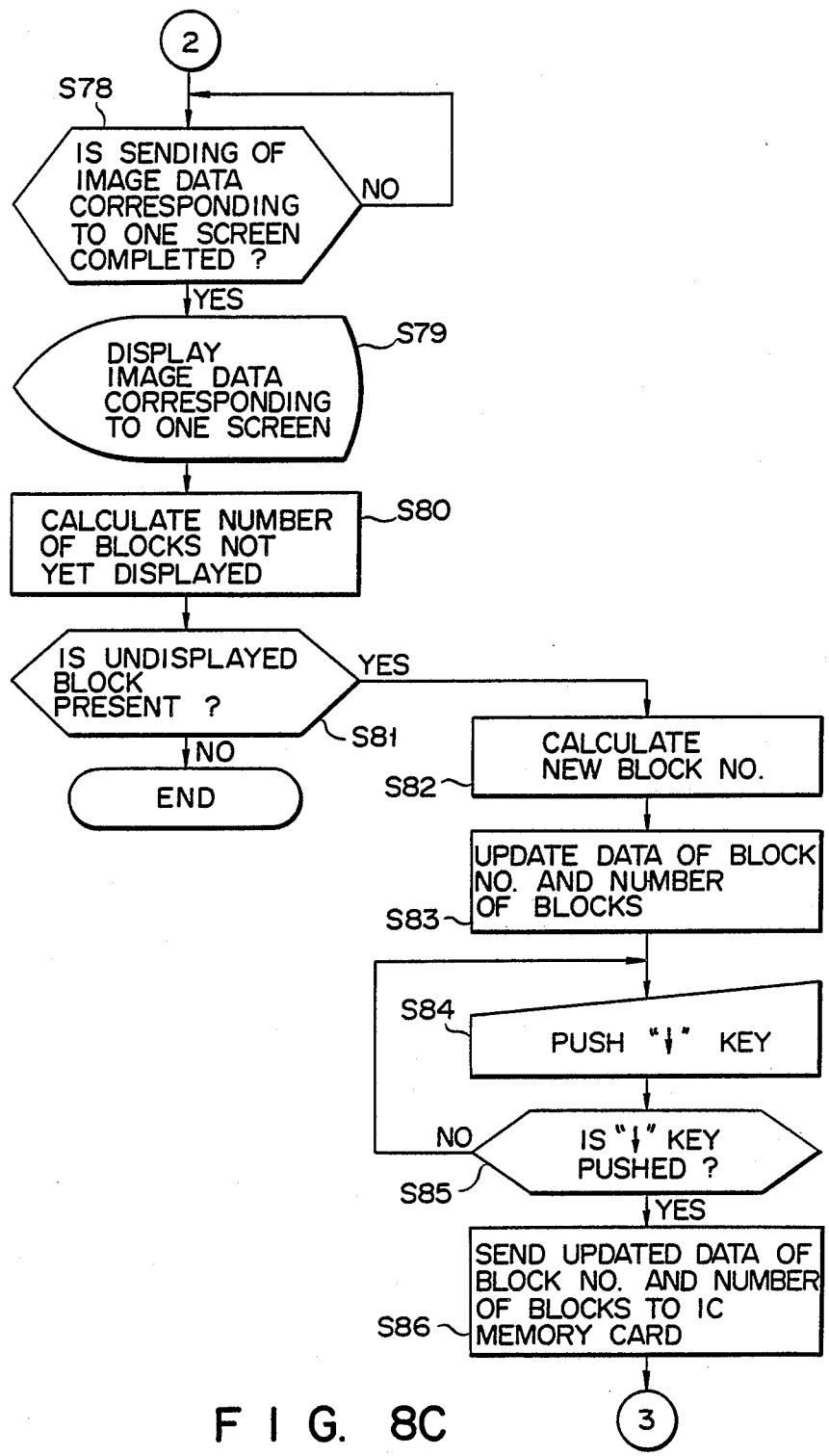

Reference is made to FIGS. 8A through 8C. An operator first inserts IC memory card 12 into slot 13 to set the card at reader/writer 30 (step S61). Then, he pushes retrieval "RETRIEVE" key 8 on keyboard 6 (step S62). In response to this, MPU 21 starts an operation based on a retrieval program in ROM 24, and displays a message to request entry of ID data by LCD 5 (step S63). According to the message, the operator enters ID data, e.g., a person's name, of retrieved image data by keyboard 6 (step S64). Then, he pushes execution "EXECUTE" key 9 (step S65). MPU 21 senses this and sends the ID data to CPU 46 of IC memory card 12, via memory input/output controller 29 and reader/writer 30 (step S66).

CPU 46 of the card searches ID data as stored in directory area 441 in RAM 44, which is coincident with the entered ID data (step S67). When the intended ID data is not found (step S68), the CPU sends response data indicating that no intended ID data is present, to MPU 21 through reader/writer 30 and memory input/output controller 29 (step S69). MPU 21 displays a message of ID data error by LCD 5, and requests the operator to reenter ID data (step S63).

If the ID data coincident with the entered ID data is found in directory area 441 of RAM 44 (step S68), CPU 46 reads out the block number and the number of secceeding blocks in the ID data coincident with the entered ID data (step S70), and sends them to memory input/output controller 29 through reader/writer 30 (step S71). MPU 21 stores the block number and the number of blocks into RAM 25 (step S72).

Then, CPU 46 sequentially reads out, on the basis of the block number and the number of succeeding blocks in the ID data, the image data of that number of blocks belonging to the image data of that block number, from the image data area 442 of RAM 44 (step S73). The image data is sequentially sent to memory input/output controller 29 through reader/writer 30 (step S74).

Memory input/output controller 29 sequentially supplies the image data through image bus 32 to image data processor 31 (step S75). Since the image data received is the condensed (coded) data, image data processor 31 expands (decodes) and restores it into the original image data (step S76). Subsequently, the restored image data is supplied through system bus 23 to RAM 25, and stored therein (step S77). Upon completion of sending of image data corresponding to one screen, viz., sending of an amount of the data which can be displayed by display 5 (step S78), MPU 21 supplies the restored image data in RAM 25 to display controller 28 via system bus 23, and LCD 5 displays it (step S79).

MPU 21 calculates the number of blocks not yet displayed by subtracting the number of blocks already displayed from the initial number of blocks (step S80). If the calculation result shows zero blocks are not displayed (step S81), MPU 21 completes the retrieval processing.

If some blocks are not yet displayed (step S81), MPU 21 adds the number of blocks already displayed to the initial block number stored in RAM 25, and calculates a new block number (step S82). It then stores the new block number and the number of the not displayed blocks into RAM 25, to update the data in RAM 25 (step S83).

At this time, if the operator pushes display shift ("↑") key 11 on keyboard 6 (steps S84 and S85), MPU 21 sends the updated block number and number of blocks to CPU 46 of IC memory card 12, through memory input/output controller 29 and reader/writer 30 (step S86).

CPU 46 sequentially reads out, on the basis of the updated block number and number of blocks, the image data of that number of blocks belonging to the image data of that block number, from the image data area 442 of RAM 44 (step S73). Subsequently, the control flows through steps S74 through S78, and display 5 displays them (step S79). The above sequence of processing steps is repeated till the not displayed blocks are reduced to zero, so that the whole image data corresponding to the ID data is displayed in a divided manner. In this way, the retrieval processing for one item of image data is performed.

As seen from the foregoing description, according to the second embodiment of the present invention, when the stored image data is retrieved and displayed, if that image data exceeds a display capability of the display, the image data within the display capability is first displayed. Then, a display shift key is operated, and the image data within the display capability is picked up from the remaining image data, and displayed. This sequence of operations is repeated till the remaining image data is zeroed.

Thus, if the inputted image data is larger than the data amount defined by the display capability of the display, such large image data may be exactly displayed in a divided manner by executing the image reading operation only once. The boundaries between the divided image data are stored in the handy image data filing apparatus. Therefore, overlapping of adjacent divided image data and dropping of image data never occurs. Since the image data is not reduced in size, the displayed image quality is not degraded. The approach to display large image data in a divided manner, which allows use of a small display, further enhances the size and weight reduction of the apparatus.

At the time of storing image data, the handy image data filing apparatus according to the second embodiment may also display the inputted image data. In this case, if the size of the inputted image data is in excess of the display capability of the display, it may be divided and successively displayed, as at the time of retrieval.

Figure 10:
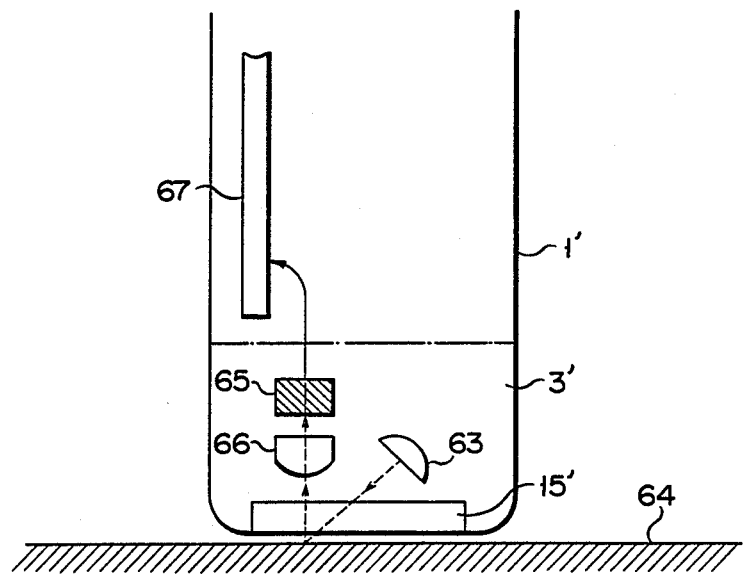
FIG. 10 is a schematic illustration of a scanner section of the handy image data filing apparatus according to the third embodiment.
Figure 9A:
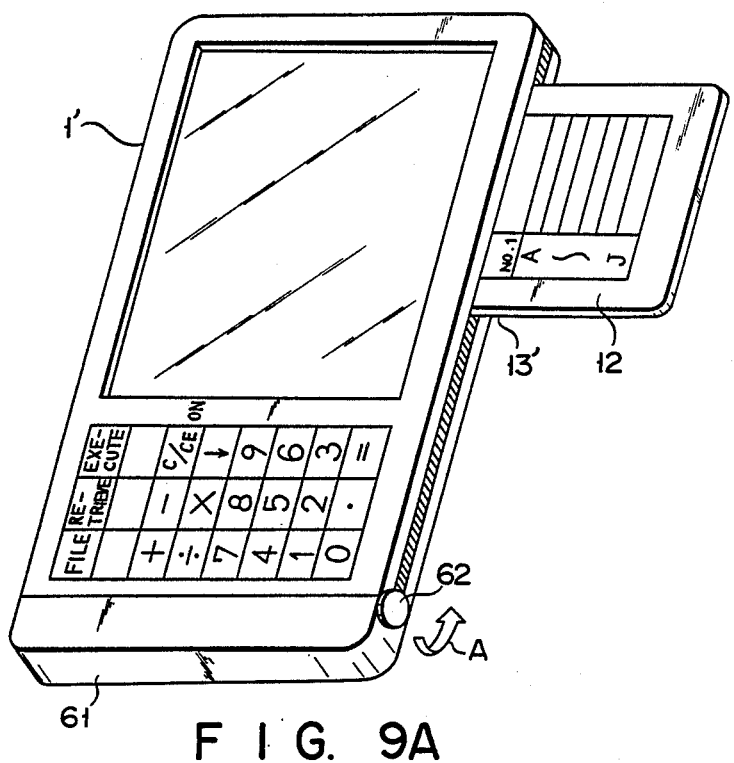
FIGS. 9A and 9B show how image data is retrieved and stored by using a handy image data filing apparatus according to a third embodiment of the present invention.
Figure 9B:
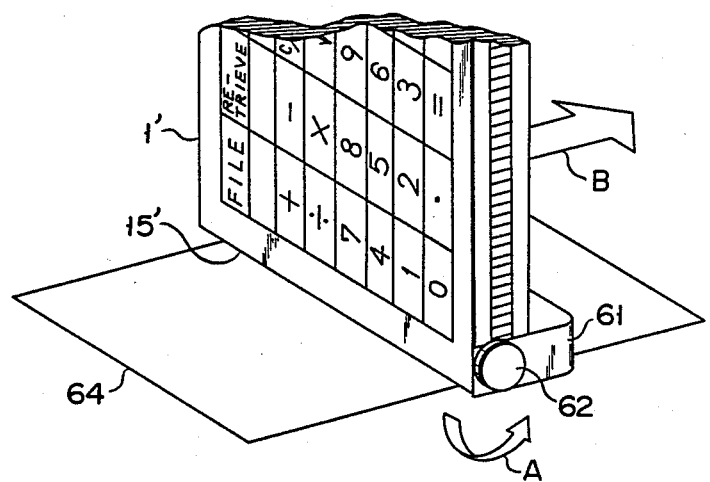

While in the first and second embodiments, the main body of the handy image data filing apparatus and the image scanner are separately provided, the image scanner may be built in the main body. An example of this approach as a third embodiment of the present invention is shown in FIGS. 9A, 9B, and 10. As shown in FIG. 10, scanner 3' is built into the lower part of main body 1'. Display window 15' (FIG. 9B) is installed at the bottom end face of main body 1'. The window 15' is protected by cover 61, which is hinged at point 62. In use, cover 61 is turned in the direction of arrow A and window 15' appears. Slot 13' for IC card memory 12 is located on a side wall of the main body.

Scanner 3' built in main body 1' is a CCD sensor of a close contact type. Scanner 3' is made up of light emitting diode (LED) 63 as a light source for emitting light rays through window 15' toward object 64 such as a name card, CCD 65 of the close contact type for receiving the light reflected from the object through window 15', and converting it into an electrical signal, rod lens 66 for guiding the reflected light to CCD 65, circuit board 67 bearing a signal processing circuit for processing the output signal of CCD 65, and a drive circuit (not shown) for driving LED 63 and CCD 65.

In handling the handy image data filing apparatus thus arranged, as shown in FIG. 9B, cover 61 is opened in the arrow direction of A and window 15' at the bottom end face is exposed. Then, it is placed in contact with object 64 and is moved along object 64 in the direction of arrow B, to read the image data on the object.

In the first to third embodiments, at the time of filing image data, the image data is displayed. However, the display of image data is not essential.

Further, an IC memory card using a mask ROM or a programmable ROM (EPROM or EEPROM) for an image data storing medium is also available for the first to third embodiments. In this case, another device specially provided is of course used for filing image data. If such a memory is used, the IC card is less expensive and thin, and very useful in handling fixed image data such as maps and time tables.

In the above-mentioned embodiments, the IC memory card contains a CPU, but IC memory cards not containing the CPU may also be used. Additionally, the image data may not only be displayed, but also printed out by a built-in or external printer.

What is claimed is:

1. A handy image data filing apparatus comprising:
   image data reading means for reading image data on an object;
   entry means for entering retrieval data which identifying the image data;
   IC memory means, removably set to the apparatus, for storing the image data;
   storage control means for storing into said IC memory means the image data read by said image data reading means together with the retrieval data entered by said entry means;
   read control means for reading out the image data from said IC memory means according to said retrieval data entered from said entry means;
   display means for displaying the image data read out by said read control means; and
   portable housing means for containing said entry means, said storage control means, said read control means, and said display means.

2. The handy image data filing apparatus according to claim 1, wherein said image data reading means includes portable image data reading means which is contained in a housing different from said portable housing means.

3. The handy image data filing apparatus according to claim 2, wherein said portable image data reading means includes a hand scanner for reading image data on an object by manually moving the hand scanner.

4. The handy image data filing apparatus according to claim 3, wherein said display means has a display area of which one of width and height is substantially equal to a scanning width of said hand scanner.

5. The handy image data filing apparatus according to claim 1, wherein
   said IC memory means includes memory means for storing the image data and terminal means for receiving data to be stored into said memory means and for outputting the data read-out from said memory means,
   said portable housing includes a slot in which at least said IC memory means is inserted, and
   said storage control means includes data input/output means for inputting and outputting data to said terminal means of said IC memory means as inserted into said slot.

6. The handy image data filing apparatus according to claim 1, wherein
   said IC memory means includes memory means having a first area for storing said retrieval data and a second area for storing said image data, and
   said storage control means includes first control means for storing the image data read by said image data reading means, together with specific data attached to a head of said image data to identify said image data, into said second area of said memory means of said IC memory means; and second control means for storing retrieval data which corresponds to said image data and is entered from said entry means, together with said specific data, into said first area of said memory means of said IC memory means.

7. The handy image data filing apparatus according to claim 6, wherein said read control means includes search means for searching retrieval data in said first area of said memory means of said IC memory means, which is coincident with the retrieval data entered from said entry means, and means for reading out the image data attached to the same specific data as the specific data which is stored corresponding to the coincident retrieval data, from said second area of said memory means of said IC memory means.

8. The handy image data filing apparatus according to claim 1, further comprising confirm means for confirming the image data read by said image data reading means, and storing said image data into said IC memory means under the control of said data storage control means, said confirm means being contained in said portable housing means.

9. The handy image data filing apparatus according to claim 8, wherein said confirm means includes
   display means for displaying the image data read by said image data reading means to said display means so that the image data can be confirmed;
   means for receiving a storing command to permit the image data displayed by said display means to be stored into said IC memory means; and
   means for storing the image data displayed on said display means into said IC memory means when said receiving means receives said storing command.

10. The handy image data filing apparatus according to claim 9, wherein said receiving means includes a predetermined key on said entry means.

11. The handy image data filing apparatus according to claim 4, further comprising display control means for displaying the image data read-out by said read control means in a divided manner on said display area of said display means when the image data read-out by said read control means exceeds an amount of data within a display capability of said display area of said display means, said display control means being contained in said portable housing means.

12. The handy image data filing apparatus according to claim 11, wherein said display control means includes:
    first partial display means for displaying on said display area of said display means the image data read-out by said read control means within its display capability when said image data read-out by said read control means exceeds the amount of data within the display capability of said display area;
    means for receiving display command to display the remaining part of the image data, which is not yet displayed; and
    second partial display means for displaying to said display means the image data not displayed, in response to receiving the display command by said receiving means.

13. The handy image data filing apparatus according to claim 12, wherein said second partial display means includes read/display control means for reading the image data, which is not displayed, from said IC memory means and causing said display means to display the image data.

14. The handy image data filing apparatus according to claim 13, wherein said IC memory means includes memory means having a first area for storing the retrieval data and a second area for storing the image data, said storage control means includes means for dividing the image data read by said image data reading means into a plurality of image data blocks, for storing the image data blocks together with serial number data attached to each head of said image data blocks to identify each said image data block, into said second area of said memory means of said IC memory means, and for storing retrieval data which corresponds to the image data read-out by said image data reading means and is entered from said entry means, together with the serial number data attached to a head of an initial image data block, into said first area of said memory means of said IC memory card, said read control means includes search means for searching retrieval data in said first area of said memory means of said IC memory means, which is coincident with the retrieval data entered from said entry means, and first means for reading out the image data blocks within the display capability of said display area of said display means from said second area of said memory means of said IC memory means, the read-out of the image data blocks being started from the image data block attached with same serial number data as the serial number data which is stored corresponding to the coincident retrieval data, and said read/display control means includes:

updating means for updating the serial number data obtained by said search means to serial number data of an initial image data block of the image data blocks not displayed;

second means for reading out from said second area of said memory means of said IC memory means the image data blocks amounting to an amount of image data blocks within the display capability of said display area starting from the image data block attached with the serial number data as is updated; and means for displaying the plurality of image data blocks read-out by said second means on said display area of said display means.

15. The handy image data filing apparatus according to claim 14, wherein said receiving means includes a predetermined key on said entry means.

16. The handy image data filing apparatus according to claim 1, wherein said image data reading means includes an image scanner, built in said portable housing means, for reading image data on an object by manually moving the image scanner.

17. The handy image data filing apparatus according to claim 16, wherein said image scanner includes an image sensor of a contact type.

18. The handy image data filing apparatus according to claim 16, wherein said display means has a display area of which one of width and height is substantially equal to the scanning width of said image scanner.

19. A handy image data filing apparatus comprising:

entry means for entering retrieval data which identifying the image data;

IC memory means, removably set to the apparatus, for storing the image data;

read control means for reading out the image data from said IC memory means according to said retrieval data entered from said entry means;

display means for displaying the image data read out by said read control means; and portable housing means for containing said entry means, said read control means, and said display means.

* * * * *